United States Patent
Wang et al.

(10) Patent No.: US 10,248,528 B2
(45) Date of Patent: Apr. 2, 2019

(54) SYSTEM MONITORING METHOD AND APPARATUS

(71) Applicant: BEIJING BAIDU NETCOM SCIENCE AND TECHNOLOGY, LTD., Beijing (CN)

(72) Inventors: Dong Wang, Beijing (CN); Bo Wang, Beijing (CN); Beibei Miao, Beijing (CN); Yun Chen, Beijing (CN); Xuanyou Guo, Beijing (CN); Xianping Qu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 140 days.

(21) Appl. No.: 15/280,825

(22) Filed: Sep. 29, 2016

(65) Prior Publication Data
US 2017/0371757 A1    Dec. 28, 2017

(30) Foreign Application Priority Data

Jun. 28, 2016   (CN) .......................... 2016 1 0493494

(51) Int. Cl.
*G06F 11/07* (2006.01)
*G06F 11/30* (2006.01)
(Continued)

(52) U.S. Cl.
CPC ...... *G06F 11/3055* (2013.01); *G06F 11/0721* (2013.01); *G06F 11/0751* (2013.01);
(Continued)

(58) Field of Classification Search
CPC ............. G06F 11/0721; G06F 11/0751; G06F 11/0772; G06F 11/24
See application file for complete search history.

(56) References Cited

U.S. PATENT DOCUMENTS

2006/0245015 A1 * 11/2006 Ikeno ................. H04N 1/00002
                                                    358/518
2009/0164443 A1 *  6/2009 Ramos .............. G06F 17/30289
(Continued)

FOREIGN PATENT DOCUMENTS

CN          101729301        6/2010

*Primary Examiner* — Jigar P Patel
(74) *Attorney, Agent, or Firm* — Marshall, Gerstein & Borun LLP

(57) ABSTRACT

A system monitoring method and apparatus comprises: collecting periodically status indicator data of a monitored system to generate a status indicator data sequence; selecting predetermined pieces of status indicator data according to data collecting time in a reverse chronological order; determining a category from predetermined categories, the predetermined pieces of status indicator data belonging to the determined category; selecting, from the historical status indicator data, status indicator data belonging to the determined category and obtained in a collection period as characteristic data of the determined category; calculating a predicted value of a status indicator of the system at a predicting moment using the characteristic data; and determining whether the system is abnormal, based on a difference between the calculated predicted value and a true value of the status indicator of the system collected at the predicting moment. The present implementation can accurately find the abnormality of the system rapidly.

9 Claims, 5 Drawing Sheets

(51) Int. Cl.
*G06F 11/32* (2006.01)
*G06F 11/34* (2006.01)

(52) U.S. Cl.
CPC ...... *G06F 11/3006* (2013.01); *G06F 11/3051* (2013.01); *G06F 11/327* (2013.01); *G06F 11/3495* (2013.01)

(56) References Cited

U.S. PATENT DOCUMENTS

2012/0233212 A1\* 9/2012 Newton ................. G06Q 30/02
707/774
2015/0180893 A1\* 6/2015 Im ....................... H04L 63/1416
726/23
2017/0132194 A1\* 5/2017 Lee ....................... H04L 67/104

\* cited by examiner

SYSTEM MONITORING METHOD AND APPARATUS

CROSS-REFERENCE TO RELATED APPLICATION

This application is related to and claims priority from Chinese Application No. 201610493494.0, filed on Jun. 28, 2016, entitled "SYSTEM MONITORING METHOD AND APPARATUS," the entire disclosure of which is hereby incorporated by reference.

TECHNICAL FIELD

The present invention relates to the technical field of computers, specifically relates to the technical field of internet, and more specifically to a system monitoring method and apparatus.

BACKGROUND

Along with continuous development of business, the scale and complexity of the Internet system increase continuously. How to fast and accurately find abnormity and pinpoint the problem becomes a very challenging task. At present, a popular method is to monitor certain external indicators capable of reflecting the system status, for example, the number of user click responses from a search engine, the number of user uploaded and posted messages to forum and microblog sites, and log data generated in an operation process of the server. These indicators are closely associated with user behaviors, able to reflect the operation condition of a machine or service, and have a specific change rule. If the indicator data do not accord with a normal change rule, it is an indication that the user behavior is abnormal or the system has a fault.

In the Internet system, such monitoring data have a huge volume and excessive types. It is unrealistic to solely rely on the operation and maintenance personnel to find whether the data are abnormal through manual monitoring. Therefore, an expected normal value of the current data is acquired through a year over year or same period calculations, the expected normal value is subtracted from the current normal value to produce a delta value, and a threshold is set for the delta value to implement automatic monitoring. However, this approach is difficult to meet the monitoring requirements on dramatically changing indicators and an inconsistent change rule appears. For example, the user behavior of searching and clicking advertisement links is affected by time and dates such as day and night, working days and weekends, statutory holidays (Tomb-sweeping Day, Dragon Boat Festival, International Labor Day, Mid-Autumn Festival, National Day and Spring Festival), newly-developing holidays (Valentine's Day, Christmas, November, 11, etc.), leading to a suboptimal detection result.

Regarding the above problem, one possible solution is to depend on the experience of the operation and maintenance personnel to frequently adjust the threshold of the monitored items. However, such operation will increase the monitoring cost, in addition, not all monitored items can be adjusted in real time due to limited manpower and experience. Therefore, the operation and maintenance personnel hope to auto-adaptively forecast the data of monitored items, thus reducing the excessive dependence on manually monitored monitoring on manual supervision.

SUMMARY

The present application aims to provide a system monitoring method and apparatus to solve the technical problems mentioned in the technical portion of the background.

In a first aspect, the present application provides a system monitoring method, comprising: collecting periodically status indicator data of a system being monitored to generate a status indicator data sequence; selecting, from the status indicator data sequence, predetermined pieces of status indicator data according to data collecting time in a reverse chronological order; determining a category from predetermined categories, the predetermined pieces of status indicator data belonging to the determined category, the predetermined categories obtained by performing clustering analysis on historical status indicator data; selecting, from the historical status indicator data, status indicator data belonging to the determined category and obtained in a collection period as characteristic data of the determined category; calculating a predicted value of a status indicator of the system at a predicting moment using the characteristic data; and determining whether the system is abnormal, based on a difference between the calculated predicted value of the status indicator of the system at the predicting moment and a true value of the status indicator of the system collected at the predicting moment.

In some embodiments, the performing clustering analysis on historical status indicator data includes: normalizing the historical status indicator data; calculating a histogram of the normalized historical status indicator data; calculating a cumulative distribution function of the histogram; clustering the cumulative distribution function by using a kmeans clustering method; and determining a classifying rule according to clustering results.

In some embodiments, the calculating a predicted value of a status indicator of the system at a predicting moment using the characteristic data includes: replacing suspected abnormal data with the characteristic data obtained at a data collecting moment and corresponding to the suspected abnormal data to calculate the predicted value, when the number of the suspected abnormal data in the predetermined pieces of status indicator data is less than a preset threshold of the abnormal data, wherein the suspected abnormal data are the status indicator data satisfying the condition that a ratio of the true value of the status indicator data to the predicted value of the status indicator data is less than a preset first threshold or greater than a preset second threshold.

In some embodiments, the selecting, from the historical status indicator data, status indicator data belonging to the determined category and in a collection period as characteristic data of the determined category includes: calculating an average value of the status indicator data of the determined category at the same moment in different periods as the characteristic data of the determined category.

In some embodiments, the determining whether the system is abnormal, based on a difference between the calculated predicted value and a true value of the status indicator of the system collected at the predicting moment includes: determining that the system is abnormal when a ratio of the true value to the predicted value is less than a preset third threshold or greater than a preset fourth threshold, wherein the third threshold is less than the first threshold and the fourth threshold is less than the second threshold.

On a second aspect, the present invention provides a system monitoring apparatus, comprising: a collecting unit, configured to collect periodically status indicator data of a system being monitored to generate a status indicator data sequence; a sliding window unit, configured to select, from the status indicator data sequence, predetermined pieces of status indicator data according to data collecting time in a reverse chronological order; a classifying unit, configured to determine a category from predetermined categories, the predetermined pieces of status indicator data belonging to the determined category, the predetermined categories obtained by performing clustering analysis on historical status indicator data; a selecting unit, configured to select, from the historical status indicator data, status indicator data belonging to the determined category and obtained in a collection period as characteristic data of the determined category; a calculating unit, configured to calculate a predicted value of a status indicator of the system at a predicting moment using the characteristic data; and a determining unit, configured to determine whether the system is abnormal, based on a difference between the calculated predicted value of the status indicator of the system at the predicting moment and a true value of the status indicator of the system collected at the predicting moment.

In some embodiments, the classifying unit is further configured to: normalize the historical status indicator data; calculate a histogram of the normalized historical status indicator data; calculate a cumulative distribution function of the histogram; cluster the cumulative distribution function by using a kmeans clustering method; and determine a classifying rule according to clustering results.

In some embodiments, the calculating unit is further configured to: replace suspected abnormal data with the characteristic data obtained at a data collecting moment and corresponding to the suspected abnormal data to calculate the predicted value, when the number of the suspected abnormal data in the predetermined pieces of status indicator data is less than a preset threshold of the abnormal data, wherein the suspected abnormal data are the status indicator data satisfying the condition that a ratio of the true value of the status indicator data to the predicted value of the status indicator data is less than a preset first threshold or greater than a preset second threshold.

In some embodiments, the selecting unit is further configured to: calculate an average value of the status indicator data of the determined category at the same moment in different periods as the characteristic data of the determined category.

In some embodiments, the determining unit is further configured to: determine that the system is abnormal when a ratio of the true value to the predicted value is less than a preset third threshold or greater than a preset fourth threshold, wherein the third threshold is less than the first threshold and the fourth threshold is less than the second threshold.

According to the system monitoring method and apparatus provided by the present invention, by classifying the historical status indicator data of the system, the characteristic data are extracted according to categories, the collected status indicator data are used to calculate the predicted value of the status indicator at some moment in the future, and whether the system is abnormal is determined by comparing the predicted value with the true value, thereby fast and accurately finding and addressing the problem of the system.

BRIEF DESCRIPTION OF THE DRAWINGS

Other features, aims and advantages of the present invention will become more obvious by detailed description on the non-limitative embodiments made by reading and referring to the following drawings.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
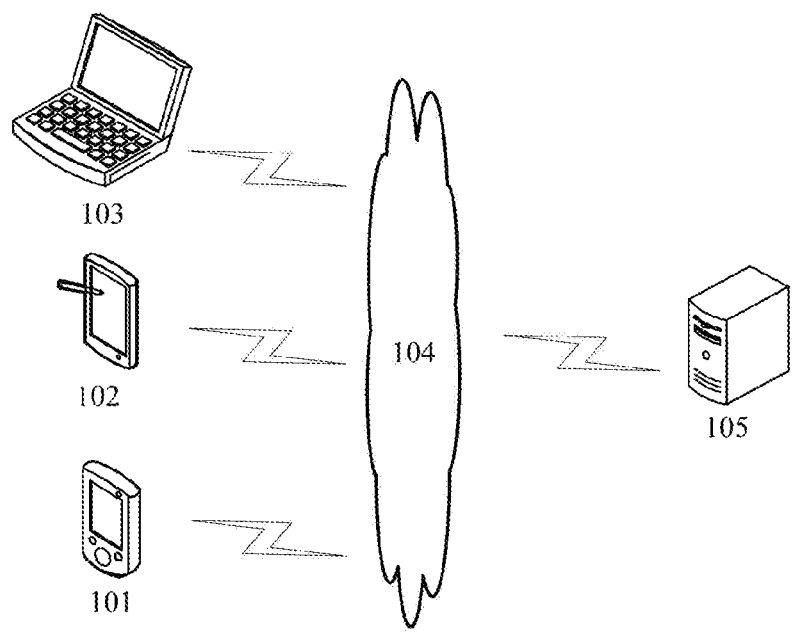
FIG. 1 is an architectural diagram of an exemplary system in which the present application may be implemented.

FIG. 1 shows an exemplary architecture of a system 100 which may be used by a system monitoring method or a system monitoring apparatus according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as web browser applications, shopping applications, search applications, instant messaging tools, mailbox clients, social platform software, etc. may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a back-end data server providing data support for the applications executed on the terminal devices 101, 102 or 103, and a server counting the number of messages of a website uploaded or issued by users, or a server collecting log data generated by the back-end data server during execution.

It should be noted that the system monitoring method according to the embodiments of the present application is generally executed by the server 105, and accordingly, the system monitoring apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
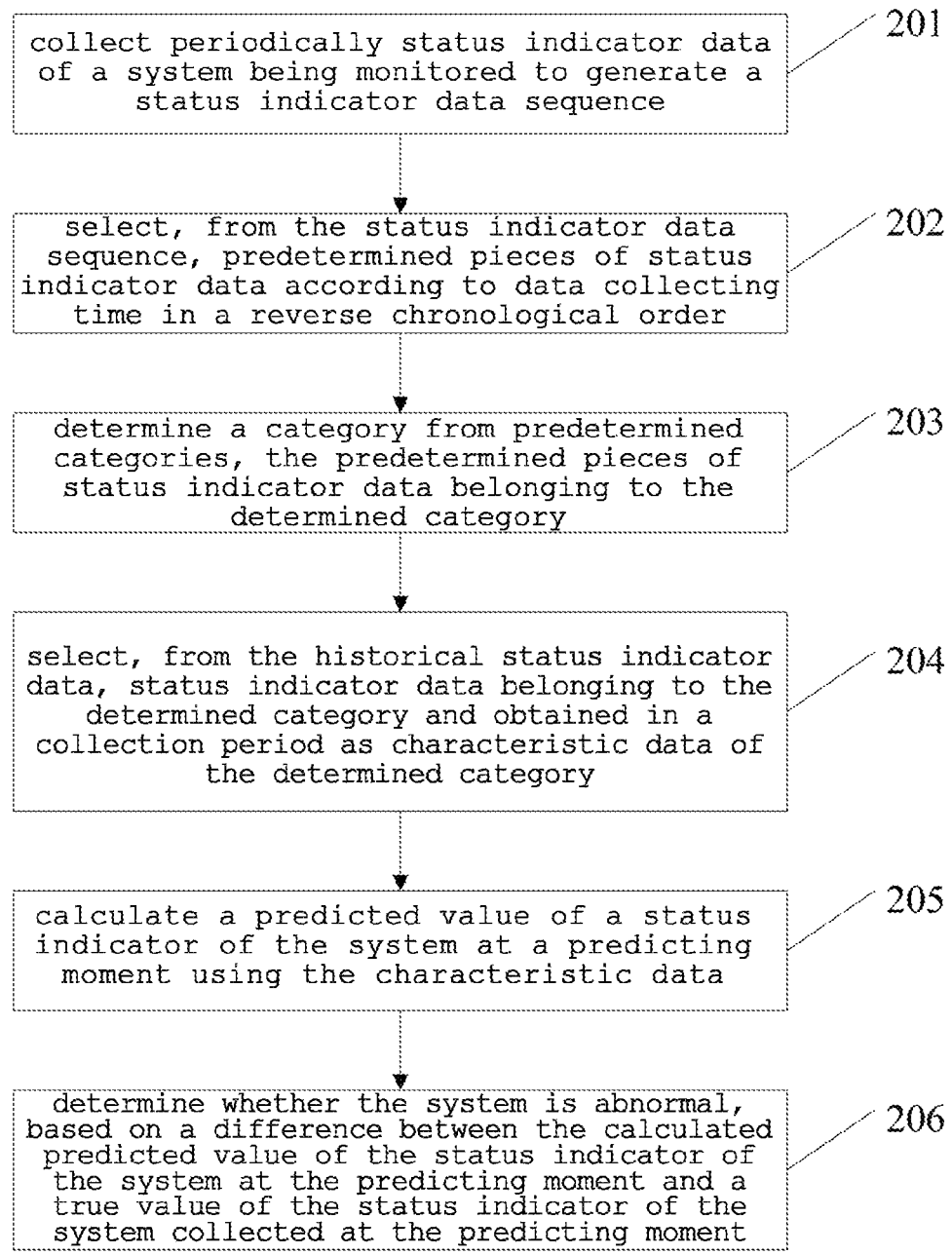
FIG. 2 is a flow chart of a system monitoring method according to one embodiment of the present application.

Continuing to refer to FIG. 2, a flow 200 of one embodiment of a system monitoring method according to the present application is shown. The system monitoring method comprises the following steps:

Step 201: collect periodically status indicator data of a system being monitored to generate a status indicator data sequence.

In the present embodiment, an electronic device (for example the server as shown in FIG. 1) on which the system monitoring method is operated may collect periodically the status indicator data of the system via a wired connection or wireless connection manner to generate the status indicator data sequence, which may be, for example, a number of user clicks to which a search engine responds, a number of messages uploaded and issued by users to websites such as a post-bar and Microblog, and log data generated in an operation process of the server, etc.

Step 202: select, from the status indicator data sequence, pieces of status indicator data according to data collecting time in a reverse chronological order.

In the present embodiment, the predetermined pieces of status indicator data closest to a time to be predicted is selected from historical status indicator data, wherein the predetermined pieces may be the number of the status indicator data in one collecting period, and may also be less than the number of the status indicator data in one collecting period. For example, the period is one day, each hour corresponds to one status indicator data and the predetermined pieces is less than or equal to 24.

Step 203: determine a category from predetermined categories, the predetermined pieces of status indicator data belonging to the determined category.

In the present embodiment, the category to which the predetermined pieces of status indicator data belongs is determined, wherein the predetermined categories is obtained by performing clustering analysis on the historical status indicator data. For example, the predetermined categories may include: weekends, legal holidays, working days, etc.

In some optional implementations of the present embodiment, the performing clustering analysis on historical status indicator data includes: normalizing the historical status indicator data; calculating a histogram of the normalized historical status indicator data; calculating a cumulative distribution function of the histogram; clustering the cumulative distribution function by using a kmeans clustering method; and determining a classifying rule according to the clustering results.

For example, if only the kmeans clustering method is used, similarity matching may be performed by comparing a Euclidean distance of data in a minimal granularity cycle (for example, the period that the system collects data is 1 day, then its minimal granularity cycle is 1 day instead of one week). However, these data contain noise, abnormal data and tendency, leading to a great difference between the clustering result and natural attributes, for example, January $25^{th}$, $26^{th}$ and $27^{th}$ are Monday, Tuesday and Wednesday respectively, but kmeans clustering will hold that the status indicator data in such time period are closer to the status indicator data of the Friday category of January $15^{th}$ and January $22^{th}$, and they are clustered into the same Friday category. However, such clustering rule is unfavorable for the operation and maintenance staff to determine a classifying rule and needs to be improved.

In order to avoid the influence of the factors such as noise, abnormal data and tendency, the present invention adopts a cluttering method (CDF-kmeans method) with the combination of a CDF (Cumulative Distribution Function) and kmeans. Firstly, the CDF of the status indicator data in the minimal granularity cycle is calculated, and then the CDF is clustered using the kmeans method. For example, the status indicator data during Mar. 1, 2015 to Jan. 4, 2016 are clustered with the CDF-k-means method, and the finally determined classifying rule is: seven categories from Monday to Sunday, three-day small holidays belonging to the Sunday category, the national holiday category, the spring festival category, newly-developing holidays, etc., which are compared with a classifying result marked by the operation and maintenance staff in accordance with the natural attributes, the result is as shown in table 1. As can be seen, the clustering result is very high in accuracy rate.

TABLE 1

| Classifying result | | | | | |
|---|---|---|---|---|---|
| Manual calibration | Detected as Saturdays | Detected as Sundays | Total detection number | Accuracy | Recall rate |
| 37 Saturdays | 30 | 10 | 40 | 75% | 81.10% |
| 39 Sundays | 7 | 29 | 36 | 80.60% | 74.40% |
| 22 holidays | Detection on the last day of Dragon Boat Festival is wrong, and on other 21 days is correct | | | 95.60% | 95.60% |
| 208 working days | All correct | | | 100% | 100% |
| 4 special holidays | Chinese Valentine's Day, November 10, November, 11, Christmas | | | 100% | 100% |

Step 204: select, from the historical status indicator data, status indicator data belonging to the determined category and obtained in a collection period as characteristic data of the determined category.

In the present embodiment, the characteristic data of one category consist of multiple characteristic values, each collecting moment corresponds to one characteristic value, and all characteristic values in one collecting period constitute the characteristic data. For example, when the status indicator data of 12 AM on Saturdays are to be predicted, the status indicator data corresponding to 0-11 AM. of Saturdays are selected, the status indicator data corresponding to 0-11 AM belongs to the Saturday category, then the indicator data of one day are selected from the status indicator data belonging to the Saturday category as the characteristic data of such category. In addition, each hour in one day corresponds to one characteristic value, for example, the posting number at 7 clock on the last Saturday is 1000, the posting number at 8 clock is 1500, then the characteristic value at 7 clock is 1000 and the characteristic value at 8 clock is 1500.

In some optional implementations of the present embodiment, average values of the status indicator data of such category at the same moment in different periods are calculated as the characteristic data of such category. For example, for the status indicator data of 12 clock at noon of Saturdays to be predicted, the average value of previous 4 pieces of data of Saturday category at the same moment before this Saturday may be selected, and also statistics such as mid-values and quantiles can serve as the characteristic data of the Saturday category.

Step 205: calculate a predicted value of a status indicator of the system at a predicted moment using the characteristic data.

In the present embodiment, a ratio of the characteristic value at the predicted moment to the predicted value equals to the ratio of a sum of the predetermined number of characteristic values to a sum of the selected predetermined number of status indicator data. For example, the predicted value is calculated by formula 1:

$$\frac{\hat{X}(k)}{\sum_{k-m}^{k-1} X(l)} = \frac{x(k)}{\sum_{k-m}^{k-1} x(j)} \quad \text{(Formula 1)}$$

wherein, k is the moment to be predicted and is a natural number, m is a window length of selected data and is a natural number, X(l) is a true value of a status indicator collected at an l moment, $\hat{X}(k)$ is a predicted value at the K moment, x(k) is the characteristic value of the category characteristic data at the k moment, and l and j are natural numbers between k-m and k-1.

Step 206: determine whether the system is abnormal, based on a difference between the calculated predicted value of the status indicator of the system at the predicting moment and a true value of the status indicator of the system collected at the predicting moment.

In the present embodiment, whether the system is abnormal can be determined according to a difference between the predicted value of the status indicator of the system calculated at the predicted moment and the true value of the status indicator of the system collected at the predicted moment. For example, if the click rate at 12 clock is predicted to be 10000 at 11 clock on Saturday, but the true value of the click rate collected at 12 clock is 100, then the system is considered to be abnormal and abnormity warning can be triggered.

In some optional implementations of the present embodiment, when a ratio of the true value to the predicted value is less than a preset third threshold or greater than a preset fourth threshold, the system is determined to be abnormal, wherein the third threshold is less than the first threshold and the fourth threshold is less than the second threshold. The third threshold may be set to be 5%. For example, if the click rate at 12 clock is predicted to be 10000 at 11 clock on Saturday, but the true value of the click rate collected at 12 clock is 100, then the system is considered to be abnormal, but if the collected true value of the click rate at 12 clock is 11000, then the system is considered to be normal.

Figure 3:
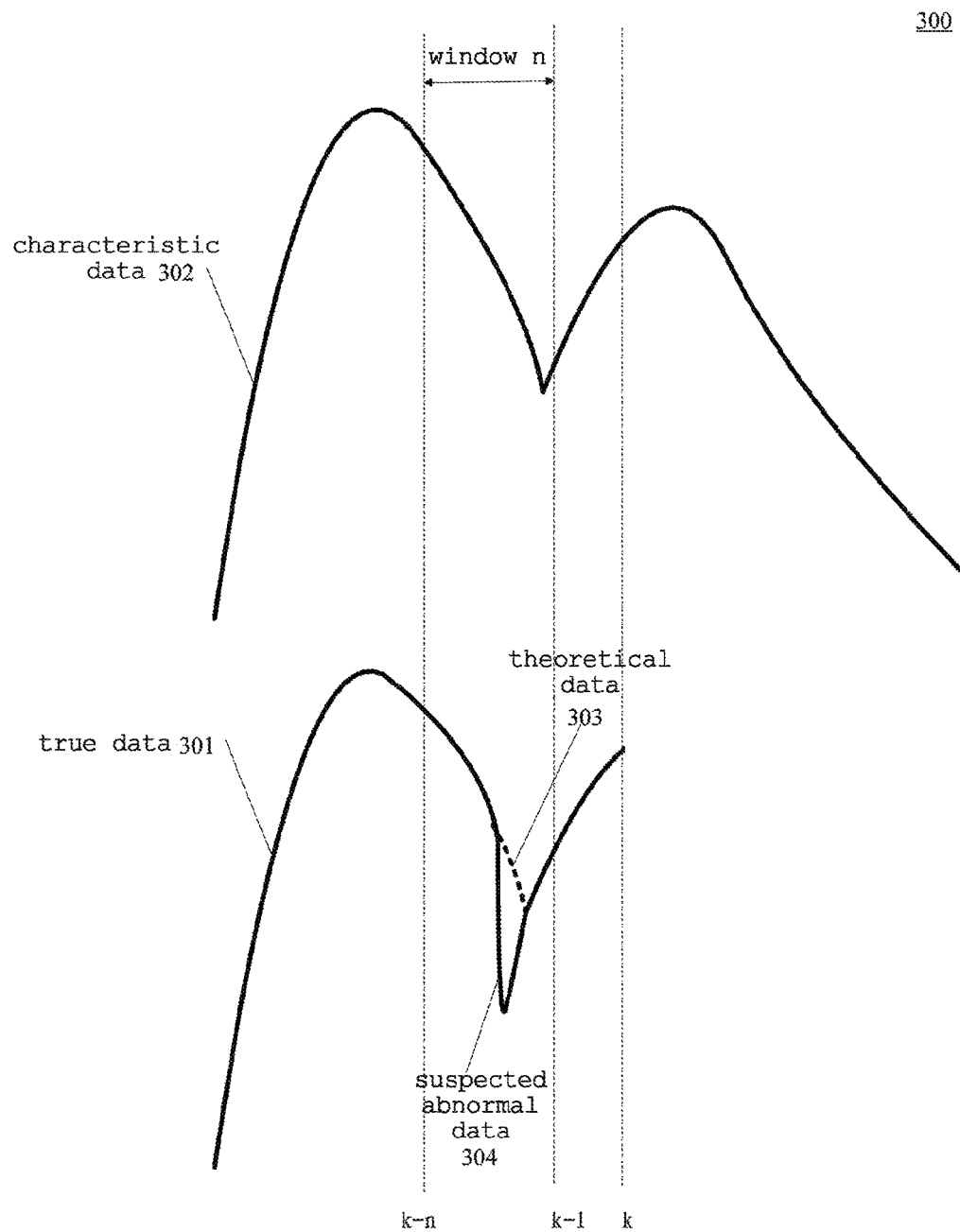
FIG. 3 is a schematic diagram of one applying scenario of the system monitoring method according to the present application.

Continuing to refer to FIG. 3, a schematic diagram of an application scenario of the system monitoring method according to the present embodiment is illustrated. In the scenario of FIG. 3, the status indicator data of the k-1 moment to the k-n moment is selected from true data 301. After the category of such data is determined, its characteristic data 302 is selected, and then the predicted value of the moment k to be predicted is calculated using the selected true data 301 and characteristic data 302. From FIG. 3, it can be seen that there is a deviation between the true data and the predicted value calculated previously, i.e., theoretical data 303, and the deviation part is suspected abnormal data 304. Therefore, the determination as to whether the system is abnormal is done.

The method according to the above embodiment of the present invention classifies the historical status indicator data of the system based on the CDF-kmeans clustering method, then obtains the characteristic data corresponding to each category, and combines this characteristic data with the true status indicator data to calculate the predicted value of the status indicator at the moment to be predicted. Therefore, the tendency of normal data can be tracked rapidly by using the predicted value, thereby whether the system is abnormal can be rapidly and accurately monitored, which make it convenient for the working staff to address the problem rapidly.

Figure 4:
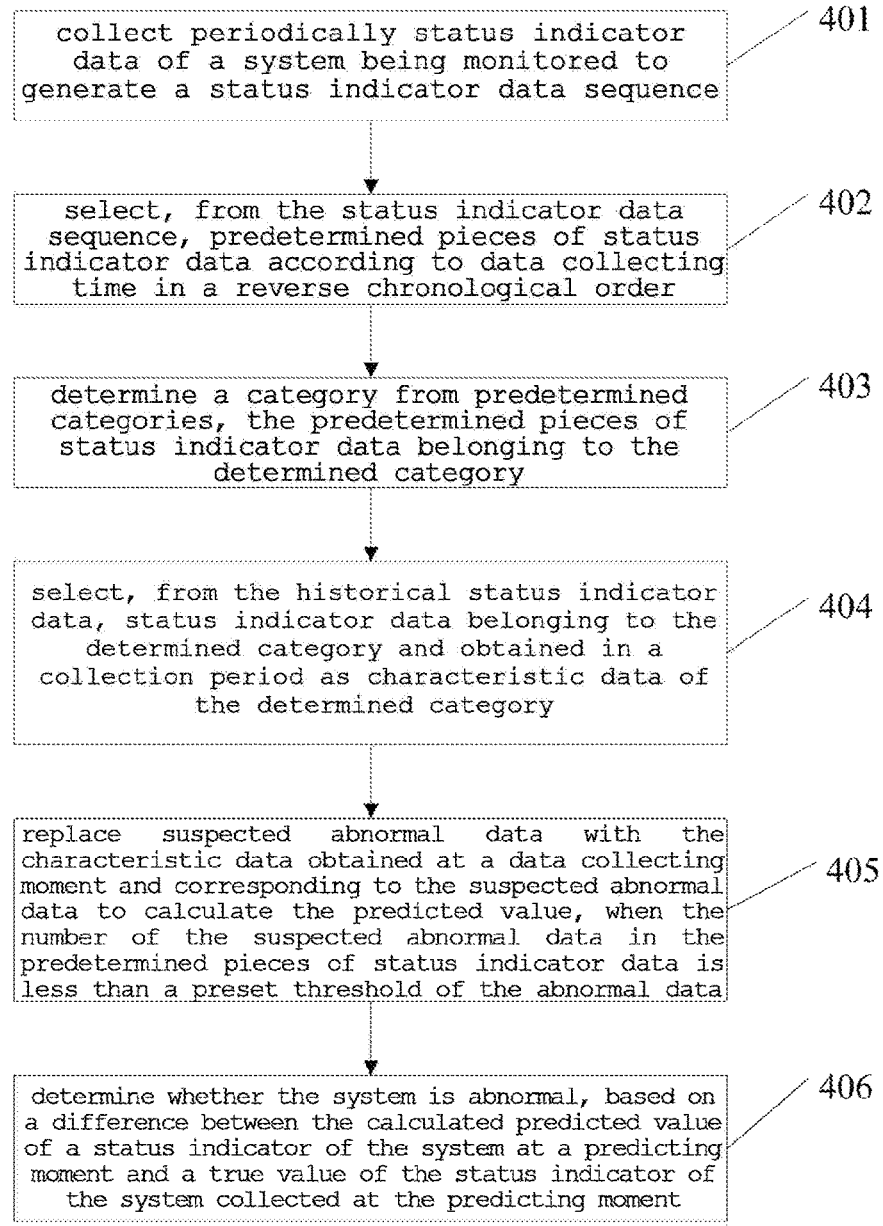
FIG. 4 is a flow chart of a system monitoring method according to another embodiment of the present application.

Further referring to FIG. 4, a flow 400 of another embodiment of the system monitoring method is illustrated. The flow 400 of the system monitoring method comprises the following steps:

Step 401: collect periodically status indicator data of a system being monitored to generate a status indicator data sequence.

Step 402: select, from the status indicator data sequence, pieces of status indicator data according to data collecting time in a reverse chronological order.

Step 403: determine a category from predetermined categories, the predetermined pieces of status indicator data belonging to the determined category.

Step 404: select, from the historical status indicator data, status indicator data belonging to the determined category and obtained in a collection period as characteristic data of the determined category.

The steps 401-404 are same as the steps 201-204 and are thus not repeated.

Step 405: replace suspected abnormal data with the characteristic data obtained at a data collecting moment and corresponding to the suspected abnormal data to calculate the predicted value, when the number of the suspected abnormal data in the predetermined pieces of status indicator data is less than a preset threshold of the abnormal data.

In the present embodiment, the suspected abnormal data are the data that a ratio of the true value of the status indicator to the predicted value is less than a preset first threshold or greater than preset second threshold, wherein the first preset threshold may be set to be 10%, and the first preset threshold may be set to be 20%. In order to improve the predicting precision, the suspected abnormal data are replaced with the characteristic data that are obtained at the data collecting moment and that correspond to the suspected abnormal data, to calculate the predicted value, but when the number of the suspected abnormal data in the predetermined number of status indicator data is not less than the minimum integer of the preset threshold, the method in formula 1 is still adopted to calculate the predicted value. The threshold of the number of the abnormal data may be same as the predetermined number, that is, when all the predetermined number of status indicator data are abnormal, the method in formula 1 is still adopted to calculate the predicted value. The threshold of the number of the abnormal data may be set to be less than the predetermined number, for example, the method in formula 1 is adopted to calculate the predicted value when more than half of the predetermined number of data is abnormal. Hence, a result that the true data cannot be fast tracked caused by an overlarge weight influence of the characteristic data on a predicted result is avoided.

For example, the predicted value is calculated by adopting the following formula 2:

$$\frac{\hat{X}(k)}{\sum\limits_{1}^{R(len\_R)} X(l) + \sum\limits_{1}^{W(len\_W)} x(L)} = \frac{x(k)}{\sum\limits_{k-m}^{k-1} x(j)} \quad \text{(Formula 2)}$$

wherein, k is the moment to be predicted and is a natural number, m is a natural number of a window length of selected data, R is a non-suspected abnormal data set in the m window before a k-1 moment, W is the suspected abnormal data set in the m window before the k-1 moment, X(l) is a true value of a status indicator collected at an l moment, l is a natural number between 1 to len R, len R is the number of selected normal data in the predetermined number of true data, $\hat{X}$(k) is a predicted value at the K moment, x(k) is the characteristic value of the category characteristic data at the k moment, j is a natural number between k-m and k-1, L is a natural number between 1 and len_W, len_W is the number of selected suspected abnormal data in the predetermined number of true data. When len_W is equal to the preset threshold of the number of the abnormal data, the W set is emptied, that is the formula 1 is adopted to calculate. The suspected abnormal data are the data that a ratio of the true value of the status indicator to the predicted value is less than a preset first threshold or greater than preset second threshold, wherein the first preset threshold can be set to be 10%, and the first preset threshold can be set to be 20%.

Step 406: determine whether the system is abnormal, based on a difference between the calculated predicted value of the status indicator of the system at the predicting moment and a true value of the status indicator of the system collected at the predicting moment.

The step 406 is same as the step 206 and is thus not repeated.

Compared the embodiment corresponding to FIG. 2, the flow 400 of the system monitoring method in the present embodiment in FIG. 4 highlights the step of processing the suspected data. Therefore, the solution described in the present embodiment can improve the prediction precision and can more accurately determine system abnormality.

Figure 5:
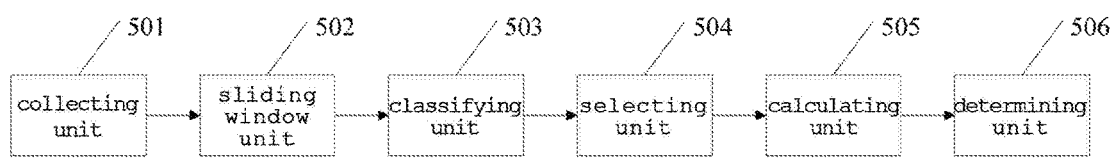
FIG. 5 is a structural schematic diagram of a system monitoring apparatus according to one embodiment of the present application.

Further referring to FIG. 5, as an implementation on the method as shown in each drawing, the present application provides an embodiment of a system monitoring apparatus, the apparatus embodiment corresponds to the method embodiment in FIG. 2 and the apparatus can be specifically applied to various electronic devices.

As shown in FIG. 5, the system monitoring apparatus 500 of the present embodiment comprises a collecting unit 501, a sliding window unit 502, a classifying unit 503, a selecting unit 504, a calculating unit 505 and a determining unit 506, wherein the collecting unit 501 is configured to collect periodically status indicator data of a system being monitored to generate a status indicator data sequence; the sliding window unit 502 is configured to select, from the status indicator data sequence, predetermined pieces of status indicator data according to data collecting time in a reverse chronological order; the classifying unit 503 is configured to determine a category from predetermined categories, the predetermined pieces of status indicator data belonging to the determined category, the predetermined categories obtained by performing clustering analysis on historical status indicator data; the selecting unit 504 is configured to select, from the historical status indicator data, status indicator data belonging to the determined category and obtained in a collection period as characteristic data of the determined category; the calculating unit 505 is configured to calculate a predicted value of a status indicator of the system at a predicting moment using the characteristic data; the determining unit 506 is configured to determine whether the system is abnormal, based on a difference between the calculated predicted value of the status indicator of the system at the predicting moment and a true value of the status indicator of the system collected at the predicting moment.

In the present embodiment, after the calculating unit 505 calculates the predicted value and the collecting unit 501 collects the new status indicator data, the sliding window unit 502 selects the predetermined pieces of status indicator data according to data collecting time in a reverse chronological order again.

In the present embodiment, after the collecting unit 501 collects the true value of the status indicator at the predicted moment, the true value is compared with the predicted value calculated by the calculating unit 505 to determine whether the system is abnormal.

In some optional implementations of the present embodiment, the classifying unit 503 is further configured to: normalize the historical status indicator data; calculate a histogram of the normalized historical status indicator data; calculate a cumulative distribution function of the histogram; cluster the cumulative distribution function by using a kmeans clustering method; and determine a classifying rule according to clustering results.

In some optional implementations of the present embodiment, the calculating unit 505 is further configured to: replace suspected abnormal data with the characteristic data obtained at a data collecting moment and corresponding to the suspected abnormal data to calculate the predicted value, when the number of the suspected abnormal data in the predetermined pieces of status indicator data is less than a preset threshold of the abnormal data; wherein the suspected abnormal data are the status indicator data satisfying the condition that a ratio of the true value of the status indicator data to the predicted value of the status indicator data is less than a preset first threshold or greater than a preset second threshold. For example, the first preset threshold may be set to be 10%, and the first preset threshold may be set to be 20%.

In some optional implementations of the present embodiment, the selecting unit 504 is further configured to: calculate an average value of the status indicator data of the determined category at the same moment in different periods as the characteristic data of the determined category.

In some optional implementations of the present embodiment, the determining unit 506 is further configured to: determine that the system is abnormal when a ratio of the true value to the predicted value is less than a preset third threshold or greater than a preset fourth threshold, wherein the third threshold is less than the first threshold and the fourth threshold is less than the second threshold. For example, the third and fourth thresholds can be set to be 5%.

Figure 6:
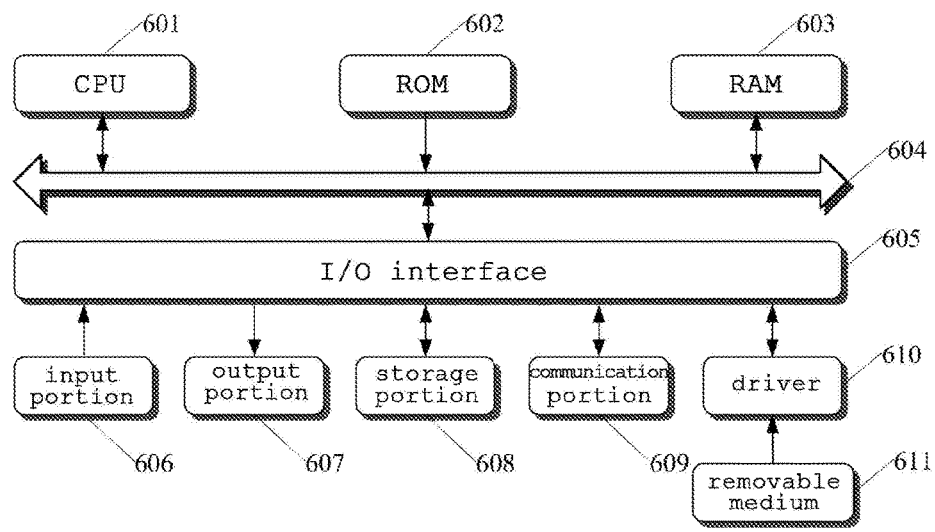
FIG. 6 is a structural schematic diagram of a computer system adapted to implement a terminal device or server of embodiments of the present application.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 609, and/or may be installed from the removable media 611. When the computer program is executed by the central processing unit (CPU) 601, the above functions defined in the method of the present application may be performed.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a collecting unit, a sliding window unit, a classifying unit, a selecting unit, a calculating unit and a determining unit, where the names of these units or modules are not considered as a limitation to the units or modules. For example, the collecting unit may also be described as "a unit for collecting periodically status indicator data of a system being monitored to generate a status indicator data sequence".

In another aspect, the present application further provides a nonvolatile computer readable storage medium. The nonvolatile computer readable storage medium may be the nonvolatile computer readable storage medium included in the apparatus in the above embodiments, or a stand-alone nonvolatile computer readable storage medium which has not been assembled into the apparatus. The nonvolatile computer readable storage medium stores one or more programs. The programs are used by one or more devices to: collect periodically status indicator data of a system being monitored to generate a status indicator data sequence; select, from the status indicator data sequence, predetermined pieces of status indicator data according to data collecting time in a reverse chronological order; determine a category from predetermined categories, the predetermined pieces of status indicator data belonging to the determined category, the predetermined categories obtained by performing clustering analysis on historical status indicator data; select, from the historical status indicator data, status indicator data belonging to the determined category and obtained in a collection period as characteristic data of the determined category; calculate a predicted value of a status indicator of the system at a predicting moment using the characteristic data; and determine whether the system is abnormal, based on a difference between the calculated predicted value of the status indicator of the system at the predicting moment and a true value of the status indicator of the system collected at the predicting moment.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A system monitoring method, comprising:
   collecting periodically status indicator data of a system being monitored to generate a status indicator data sequence;
   selecting, from the status indicator data sequence, predetermined pieces of status indicator data according to data collecting time in a reverse chronological order;
   determining a category from predetermined categories, the predetermined pieces of status indicator data belonging to the determined category, the predetermined categories obtained by performing clustering analysis on historical status indicator data;
   selecting, from the historical status indicator data, status indicator data belonging to the determined category and obtained in a collection period as characteristic data of the determined category;
   calculating a predicted value of a status indicator of the system at a predicting moment using the characteristic data, comprising
      replacing suspected abnormal data with the characteristic data obtained at a data collecting moment and corresponding to the suspected abnormal data to calculate the predicted value, when the number of the suspected abnormal data in the predetermined pieces of status indicator data is no more than half of the number of the predetermined pieces;

wherein the suspected abnormal data are the status indicator data satisfying the condition that a ratio of the true value of the status indicator data to the predicted value of the status indicator data is less than a preset first threshold or greater than a preset second threshold; and determining whether the system is abnormal, based on a difference between the calculated predicted value and a true value of the status indicator of the system collected at the predicting moment.

2. The system monitoring method according to claim 1, wherein the performing clustering analysis on historical status indicator data comprises:

normalizing the historical status indicator data;

calculating a histogram of the normalized historical status indicator data;

calculating a cumulative distribution function of the histogram;

clustering the cumulative distribution function by using a kmeans clustering method; and determining a classifying rule according to clustering results.

3. The system monitoring method according to claim 1, wherein the selecting, from the historical status indicator data, status indicator data belonging to the determined category and in a collection period as characteristic data of the determined category comprises:

calculating an average value of the status indicator data of the determined category at the same moment in different periods as the characteristic data of the determined category.

4. The system monitoring method according to claim 1, wherein the determining whether the system is abnormal, based on a difference between the calculated predicted value and a true value of the status indicator of the system collected at the predicting moment comprises:

determining that the system is abnormal when a ratio of the true value to the predicted value is less than a preset third threshold or greater than a preset fourth threshold, wherein the third threshold is less than the first threshold and the fourth threshold is less than the second threshold.

5. A system monitoring apparatus, comprising:

at least one processor; and a memory storing instructions, which when executed by the at least one processor, cause the at least one processor to perform operations, the operations comprising:

collecting periodically status indicator data of a system being monitored to generate a status indicator data sequence;

selecting, from the status indicator data sequence, predetermined pieces of status indicator data according to data collecting time in a reverse chronological order;

determining a category from predetermined categories, the predetermined pieces of status indicator data belonging to the determined category, the predetermined categories obtained by performing clustering analysis on historical status indicator data;

selecting, from the historical status indicator data, status indicator data belonging to the determined category and obtained in a collection period as characteristic data of the determined category;

calculating a predicted value of a status indicator of the system at a predicting moment using the characteristic data, comprising replacing suspected abnormal data with the characteristic data obtained at a data collecting moment and corresponding to the suspected abnormal data to calculate the predicted value, when the number of the suspected abnormal data in the predetermined pieces of status indicator data is no more than half of the number of the predetermined pieces;

wherein the suspected abnormal data are the status indicator data satisfying the condition that a ratio of the true value of the status indicator data to the predicted value of the status indicator data is less than a preset first threshold or greater than a preset second threshold; and determining whether the system is abnormal, based on a difference between the calculated predicted value of the status indicator of the system at the predicting moment and a true value of the status indicator of the system collected at the predicting moment.

6. The system monitoring apparatus according to claim 5, wherein the performing clustering analysis on historical status indicator data comprises:

normalizing the historical status indicator data;

calculating a histogram of the normalized historical status indicator data;

calculating a cumulative distribution function of the histogram;

clustering the cumulative distribution function by using a kmeans clustering method; and determining a classifying rule according to clustering results.

7. The system monitoring apparatus according to claim 5, wherein the selecting, from the historical status indicator data, status indicator data belonging to the determined category and in a collection period as characteristic data of the determined category comprises:

calculating an average value of the status indicator data of the determined category at the same moment in different periods as the characteristic data of the determined category.

8. The system monitoring apparatus according to claim 5, wherein the determining whether the system is abnormal, based on a difference between the calculated predicted value and a true value of the status indicator of the system collected at the predicting moment comprises:

determining that the system is abnormal when a ratio of the true value to the predicted value is less than a preset third threshold or greater than a preset fourth threshold, wherein the third threshold is less than the first threshold and the fourth threshold is less than the second threshold.

9. A non-transitory storage medium storing one or more programs, the one or more programs when executed by an apparatus, causing the apparatus to perform a system monitoring method, comprising:

collecting periodically status indicator data of a system being monitored to generate a status indicator data sequence;

selecting, from the status indicator data sequence, predetermined pieces of status indicator data according to data collecting time in a reverse chronological order;

determining a category from predetermined categories, the predetermined pieces of status indicator data belonging to the determined category, the predetermined categories obtained by performing clustering analysis on historical status indicator data;

selecting, from the historical status indicator data, status indicator data belonging to the determined category and obtained in a collection period as characteristic data of the determined category;

calculating a predicted value of a status indicator of the system at a predicting moment using the characteristic data, comprising replacing suspected abnormal data with the characteristic data obtained at a data collecting moment and corresponding to the suspected abnormal data to calculate the predicted value, when the number of the suspected abnormal data in the predetermined pieces of status indicator data is no more than half of the number of the predetermined pieces;

wherein the suspected abnormal data are the status indicator data satisfying the condition that a ratio of the true value of the status indicator data to the predicted value of the status indicator data is less than a preset first threshold or greater than a preset second threshold; and determining whether the system is abnormal, based on a difference between the calculated predicted value and a true value of the status indicator of the system collected at the predicting moment.

\* \* \* \* \*